US008380087B2

(12) United States Patent
Chen

(10) Patent No.: US 8,380,087 B2
(45) Date of Patent: Feb. 19, 2013

(54) HIGH PERFORMANCE GIGABIT PASSIVE OPTICAL NETWORK

(75) Inventor: David Z Chen, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/105,429

(22) Filed: May 11, 2011

(65) Prior Publication Data

US 2011/0217042 A1 Sep. 8, 2011

Related U.S. Application Data

(63) Continuation of application No. 11/956,764, filed on Dec. 14, 2007, now Pat. No. 7,962,038.

(51) Int. Cl.
*H04J 14/02* (2006.01)

(52) U.S. Cl. ............... 398/212; 398/69; 398/91

(58) Field of Classification Search .............. 398/66–72, 398/168
See application file for complete search history.

(56) References Cited

U.S. PATENT DOCUMENTS

| 5,005,167 | A | * | 4/1991 | Arthurs et al. ............ 398/54 |
| 6,137,613 | A | | 10/2000 | Ushirozawa | |
| 6,151,144 | A | | 11/2000 | Knox | |
| 6,160,660 | A | | 12/2000 | Aina et al. | |
| 6,320,996 | B1 | | 11/2001 | Scobey et al. | |
| 6,606,430 | B2 | | 8/2003 | Bartur et al. | |
| 6,674,966 | B1 | | 1/2004 | Koonen | |
| 7,257,327 | B2 | | 8/2007 | Small | |
| 2001/0028489 | A1 | | 10/2001 | Ishikawa et al. | |
| 2003/0081286 | A1 | | 5/2003 | Tei | |
| 2007/0154217 | A1 | | 7/2007 | Kim et al. | |
| 2008/0246968 | A1 | * | 10/2008 | Kelso et al. ............ 356/417 |

FOREIGN PATENT DOCUMENTS

| JP | 2006-197489 | 7/2006 |
| WO | 91/13377 | 9/1991 |

OTHER PUBLICATIONS

Notification of Transmittal of the International Search Report and the Written Opinion of the International Searching Authority, or the Declaration corresponding to PCT/US08/84514, Feb. 13, 2009, 10 pages.

* cited by examiner

*Primary Examiner* — Leslie Pascal

(57) ABSTRACT

A system includes an optical line terminal (OLT) that includes an OLT transmitter. The OLT transmitter includes one or more fixed wavelength optical sources that generate an optical signal at a first wavelength, and an optical waveguide that transmits the optical signal at the first wavelength in an optical network.

20 Claims, 15 Drawing Sheets

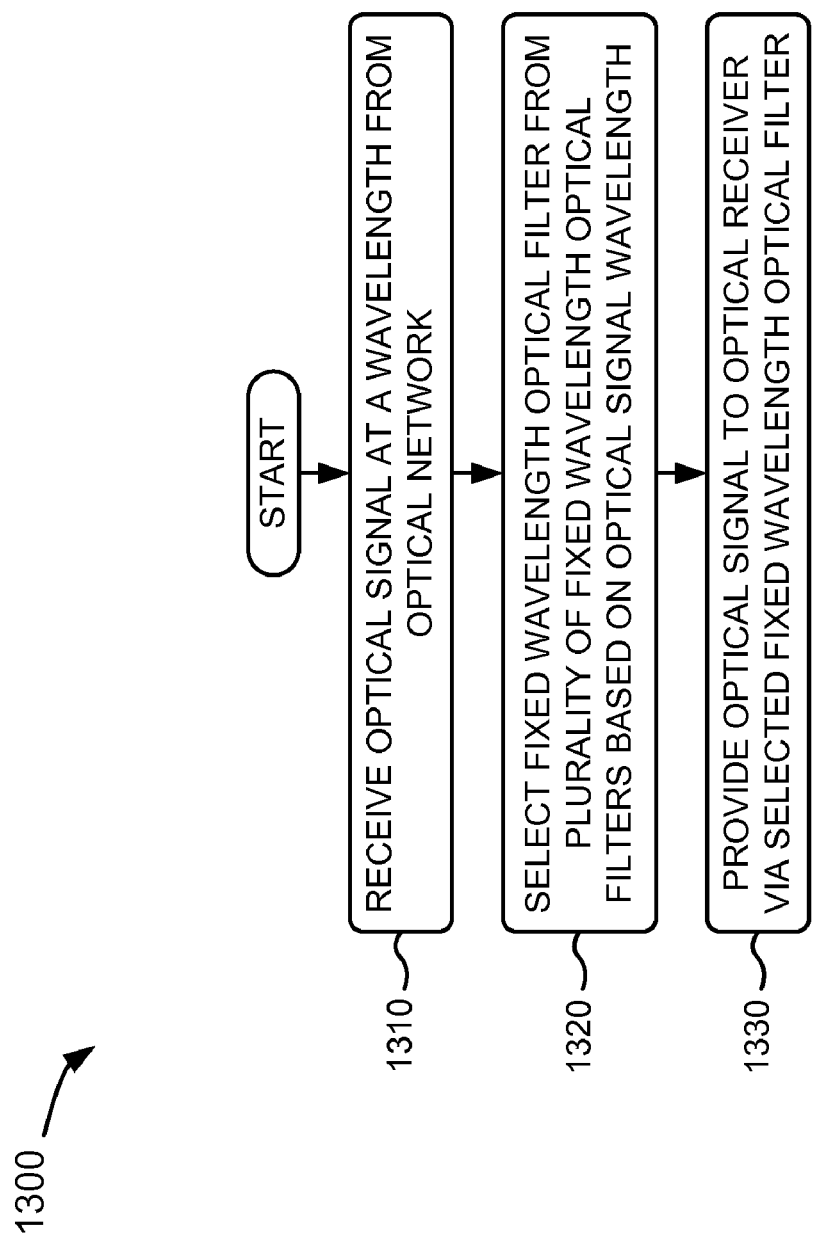

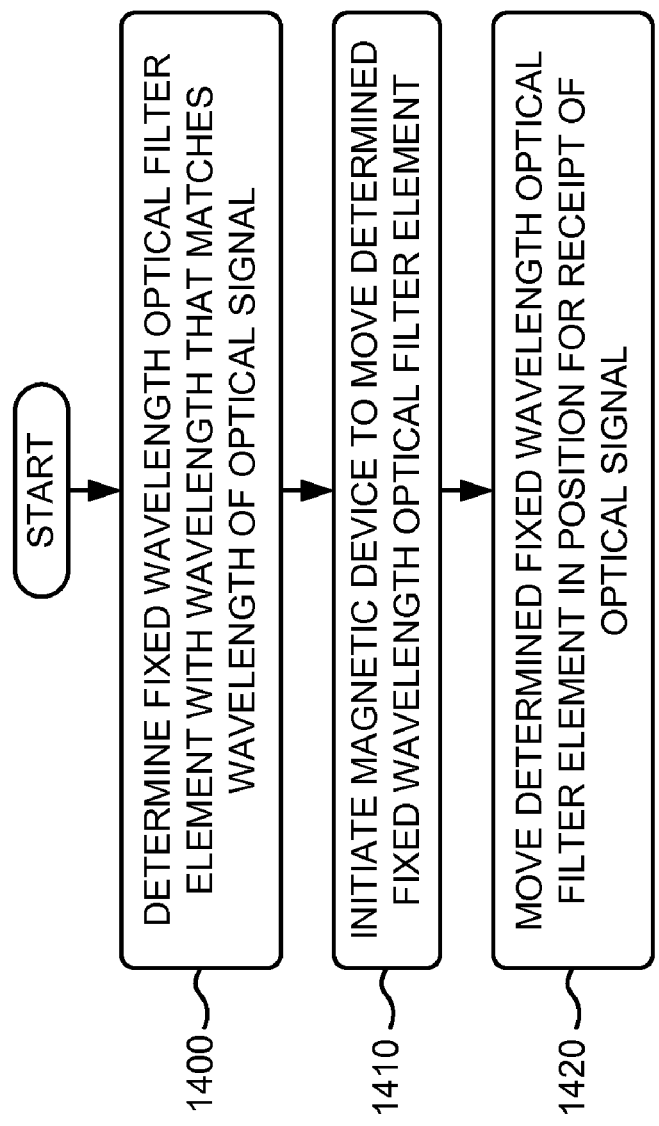

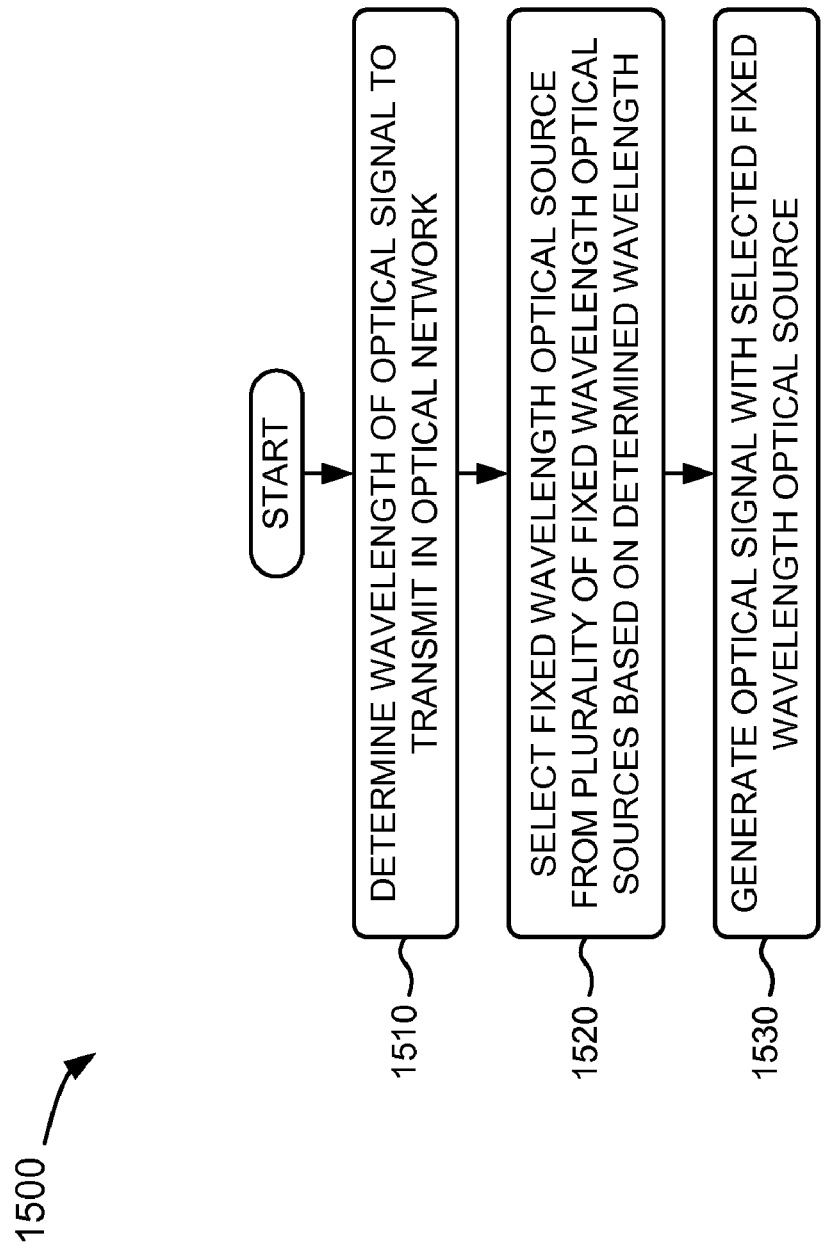

HIGH PERFORMANCE GIGABIT PASSIVE OPTICAL NETWORK

RELATED APPLICATION

This application is a continuation of U.S. patent application Ser. No. 11/956,764, filed Dec. 14, 2007, the disclosure of which is incorporated herein by reference.

BACKGROUND

A passive optical network (PON) is a point-to-multipoint, fiber to premises network architecture in which optical splitters are used to enable a single optical fiber to serve multiple premises (e.g., customers or end users). A PON may include an optical line termination and an optical network termination or terminal (ONT) interconnected by a passive optical distribution network (ODN). One or more optical line terminations may be located at a service provider's central office. One or more ONTs may be located at customers' premises. An optical line termination may include one or more optical line terminals (OLTs or PON-LTs) that communicate with a unique set of ONTs, and there may be a one-to-many relationship between an OLT and the ONTs. Downstream or broadcast traffic (e.g., optical signals) may be broadcast from an OLT to all associated ONTs. The downstream or broadcast traffic may be addressed to specific ONTs and unaddressed ONTs may ignore the traffic, and encryption may be used to prevent eavesdropping. Upstream traffic (e.g., optical signals) may be sent from the ONTs to an associated OLT, and the optical line termination may combine the upstream traffic from all of its OLTs using a multiple access protocol.

A gigabit PON (G-PON) is a PON that supports higher traffic rates, enhanced security, and Layer 2 protocols. Downstream or broadcast traffic in a G-PON may be broadcast from each OLT to ONTs associated with the OLT at a data rate of "2.5" gigabits per second (G/s or Gbps). Upstream traffic may be sent from each ONT to the OLT at a data rate of "1.25" G/s. A G-PON may provide different services (e.g., video (e.g., television), data (e.g., high-speed Internet access), and/or voice (e.g., telephone) services) over a single optical connection with each ONT.

BRIEF DESCRIPTION OF THE DRAWINGS

FIGS. 12-15 depict flow charts of exemplary processes according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Currently, most of the new proposed architectures for advanced passive optical networks utilize expensive components. For example, the new proposed passive optical networks depend on wavelength division multiplexing (WDM), which requires use of expensive array waveguide gratings (which may be used as optical multiplexers and/or de-multiplexers), optical interleavers (e.g., three-port passive fiber-optic devices that are used to combine two sets of dense WDM channels into a composite signal stream), optical multiplexers, optical de-multiplexers, optical isolators, tunable optical sources (e.g., lasers), tunable filters, etc. Some conventional high cost optical sources and/or tunable filters may include "C band" or "L band" tunable optical sources and/or tunable filters having a tunable range of at least about "30" to "45" nanometers.

Implementations described herein may provide one or more inexpensive fixed wavelength (or fixed frequency) optical sources and/or one or more inexpensive, dynamically-activated fixed wavelength (or fixed frequency) optical filters in an optical network (e.g., a G-PON) that includes one or more optical line terminations (e.g., at a central office) and one or more optical network terminals (ONTs) (e.g., at end users' premises). Each optical line termination may include one or more optical line terminals (OLTs) that may communicate with associated ONTs. For example, in one implementation, the systems and/or methods may provide a fixed wavelength optical source and a group of fixed wavelength optical filters in an optical network. The systems and/or methods may generate an optical signal having a specified wavelength (e.g., the fixed wavelength), and may select one of the group of fixed wavelength optical filters based on the wavelength of the optical signal. The systems and/or methods may receive the optical signal with the selected fixed wavelength optical filter.

Figure 1:
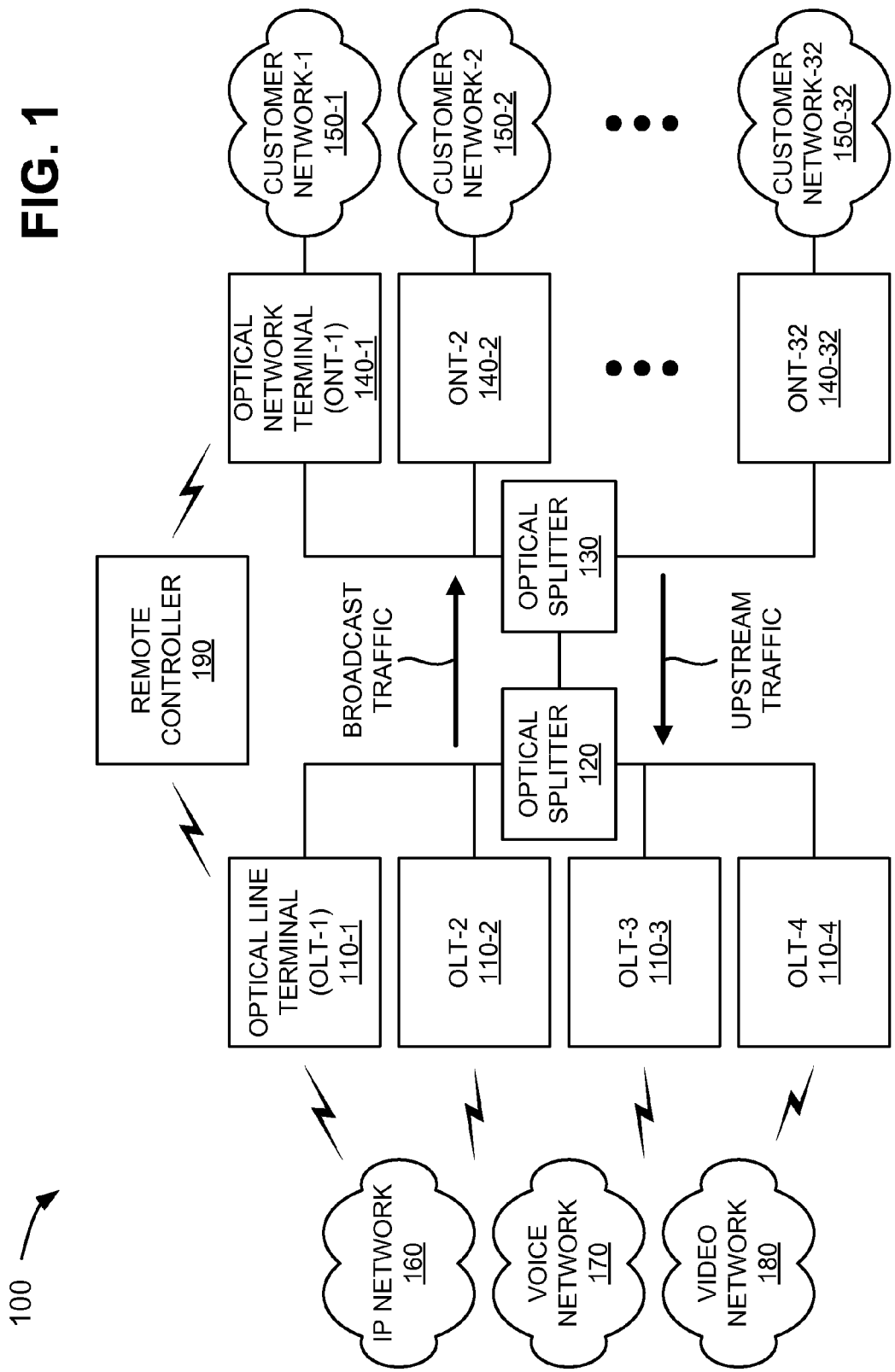
FIG. 1 is an exemplary diagram of a network in which systems and methods described herein may be implemented.

FIG. 1 is an exemplary diagram of a network 100 in which systems and methods described herein may be implemented. As illustrated, network 100 may include one or more optical line terminals (OLTs) 110-1, 110-2, 110-3, and 110-4 (collectively referred to as "OLTs 110" or individually as "OLT 110"), optical splitters 120 and 130, one or more optical network terminals (ONTs) 140-1, 140-2, ..., 140-32 (collectively referred to as "ONTs 140" or individually as "ONT 140"), one or more customer networks 150-1, 150-2, ..., 150-32 (collectively referred to as "customer networks 150" or individually as "customer network 150") associated with corresponding ONTs 140, an Internet Protocol (IP) network 160, a voice network 170, a video network 180, and/or a remote controller 190. Four OLTs, two optical splitters, thirty-two ONTs, a single remote controller, and multiple networks have been illustrated in FIG. 1 for simplicity. In practice, there may be more or less OLTs, optical splitters, ONTs, remote controllers, and/or networks. Also, in some instances, one of OLTs 110 may perform one or more functions performed by another one of OLTs 110. In one implementation, OLTs 110, optical splitters 120 and 130, and ONTs 140 may form a G-PON. In other implementations, OLTs 110, optical splitters 120 and 130, and ONTs 140 may form other types of PONs (e.g., a broadband PON (B-PON), an Ethernet PON (E-PON), etc.).

OLTs 110 may reside in an optical line termination provided at a central office (e.g., of a service provider), and each OLT 110 may include a device that terminates a PON, and provides an interface between the PON and other networks (e.g., IP network 160, voice network 170, video network 180, etc.). In one implementation, each OLT 110 may provide Ethernet aggregation capabilities and/or link aggregation on ports for additional capacity and/or traffic protection. OLTs 110 may receive information (e.g., from IP network 160, voice network 170, video network 180, etc.), and/or may send the information as broadcast or downstream traffic (e.g., optical signals) to ONTs 140. OLTs 110 may manage upstream traffic provided by ONTs 140 by informing ONTs 140 when they can and/or cannot transmit upstream traffic. Further details of OLTs 110 are provided below in connection with FIGS. 3-6.

Optical splitter 120 may include an optical device (e.g., a 1:4, six decibel (dB) optical splitter provided in optical line termination) that splits an optical signal (e.g., upstream traffic provided by ONTs 140) into four optical signals (e.g., multiple paths of optical signals). For example, in one implementation, optical splitter 120 may receive a single optical signal (e.g., upstream traffic) from optical splitter 130, may split the optical signal into four optical signals, and may provide the four optical signals to one or more of OLTs 110. In other implementations, optical splitter 120 may receive one to four optical signals (e.g., downstream traffic) from one or OLTs 110 (e.g., one from each OLT 110), and may pass the four optical signals as a single optical signal to optical splitter 130.

Optical splitter 130 may include an optical device (e.g., a 1:32, sixteen dB optical splitter) that splits an optical signal (e.g., broadcast or downstream traffic provided by OLTs 110) into thirty-two optical signals. For example, in one implementation, optical splitter 130 may receive a single optical signal (e.g., broadcast or downstream traffic) from optical splitter 120, may split the optical signal into thirty-two optical signals, and may provide the thirty-two optical signals to one or more of ONTs 140. In other implementations, optical splitter 130 may receive one to thirty-two optical signals (e.g., upstream traffic) from ONTs 140 (e.g., one from each ONT 140), and may pass the one or more optical signals as a single optical signal to optical splitter 120.

ONTs 140 may reside at customers' premises and each ONT 140 may include a device that terminates a PON, and provides an interface between the PON and the customer's premises (e.g., customer networks 150, etc.). In one implementation, each ONT 140 may provide multiple service interfaces for the customer (e.g., it may provide an interface for telephony (i.e., voice) services, an interface for Ethernet (i.e., data) services, an interface for television (i.e., video) services, etc.). ONTs 140 may receive information (e.g., from customer network 150, etc.), and/or may send the information as upstream traffic (e.g., optical signals) to OLTs 110. ONTs 140 may receive downstream traffic (e.g., from IP network 160, voice network 170, video network 180, etc.) provided by OLTs 110, and/or may send the downstream traffic to devices provided in customer network 150. Further details of ONTs 140 are provided below in connection with FIGS. 3 and 7-9.

Each of customer networks 150 may include a local area network (LAN), a wide area network (WAN), or a combination of networks that provide data, voice, and/or television services to the customer or end user. In one implementation, each of customer networks 150 may include a network interconnecting one or more devices providing data services (e.g., personal computers, workstations, laptops, etc.), one or more devices providing voice services (e.g., telephones), and/or one or more devices providing video services (e.g., televisions, set-top boxes, etc.).

IP network 160 may include a LAN, a WAN, a metropolitan area network (MAN), an intranet, the Internet, or a combination of networks that provide data services. In one implementation, IP network 160 may include the Internet, and/or a network that provides access to the Internet.

Voice network 170 may include a Public Land Mobile Network (PLMN), a telephone network, such as the Public Switched Telephone Network (PSTN) or a cellular telephone network, or a combination of networks that provide voice services (e.g., telephony services). In one implementation, voice network 170 may include a Synchronous Optical Network (SONET)-based network, the PSTN network, a voice media gateway, etc.

Video network 180 may include a LAN, a MAN, a WAN, the Internet, an intranet, a PSTN, or a combination of networks that provide video (e.g., television) services. In one implementation, video network 180 may include one or more content servers that provide television programming, video content (e.g., movies, on-demand services, live television, etc.), etc. to a set-top box and a television monitor, one or more video encoders, etc.

Remote controller 190 may include one or more server entities, or other types of computation or communication devices, that gather, process, search, and/or provide information in a manner described herein. In one implementation, remote controller 190 may determine bandwidth demand for upstream and/or broadcast traffic between OLTs 110 and ONTs 140, and/or may dynamically adjust OLTs 110 and/or ONTs 140 to balance traffic in network 100 based on the determined bandwidth demand. Remote controller 190 may also dynamically adjust OLTs 110 and/or ONTs 140 to protect the traffic in network 100, and/or to increase bandwidth for the traffic based on the determined bandwidth demand. Remote controller 190 may be provided in a central office, in optical line terminations, etc. In other implementations, remote controller 190 may adjust optical filters provided in OLTs 110 and/or ONTs 140 to turn on and/or off optical signals of particular wavelengths at a user location, may switch on wavelengths for additional bandwidth, may switch on or off wavelengths to control user access to video channels (e.g., premium packages, etc.), etc.

The arrangement described above with respect to network 100 may enable omission of components typically used in optical networks. For example, in one implementation, network 100 may omit expensive equipment, such as optical array waveguide gratings, optical interleavers, optical multiplexers, optical de-multiplexers, optical isolators, tunable optical sources, tunable filters, etc. Omission of such components may reduce the cost and/or complexity of network 100. The arrangement of network 100 may also make use of existing optical power splitters (e.g., optical splitters 120 and 130), and may simplify network upgrades (e.g., to ten, forty, and one-hundred Gbps passive optical networks). Furthermore, the arrangement of network 100 may eliminate optical isolation so that broadcast and upstream traffic may be provided on a single optical fiber (e.g., a receiving filter (not shown)) may block any unwanted wavelength and interference from opposite direction traffic).

Figure 2:
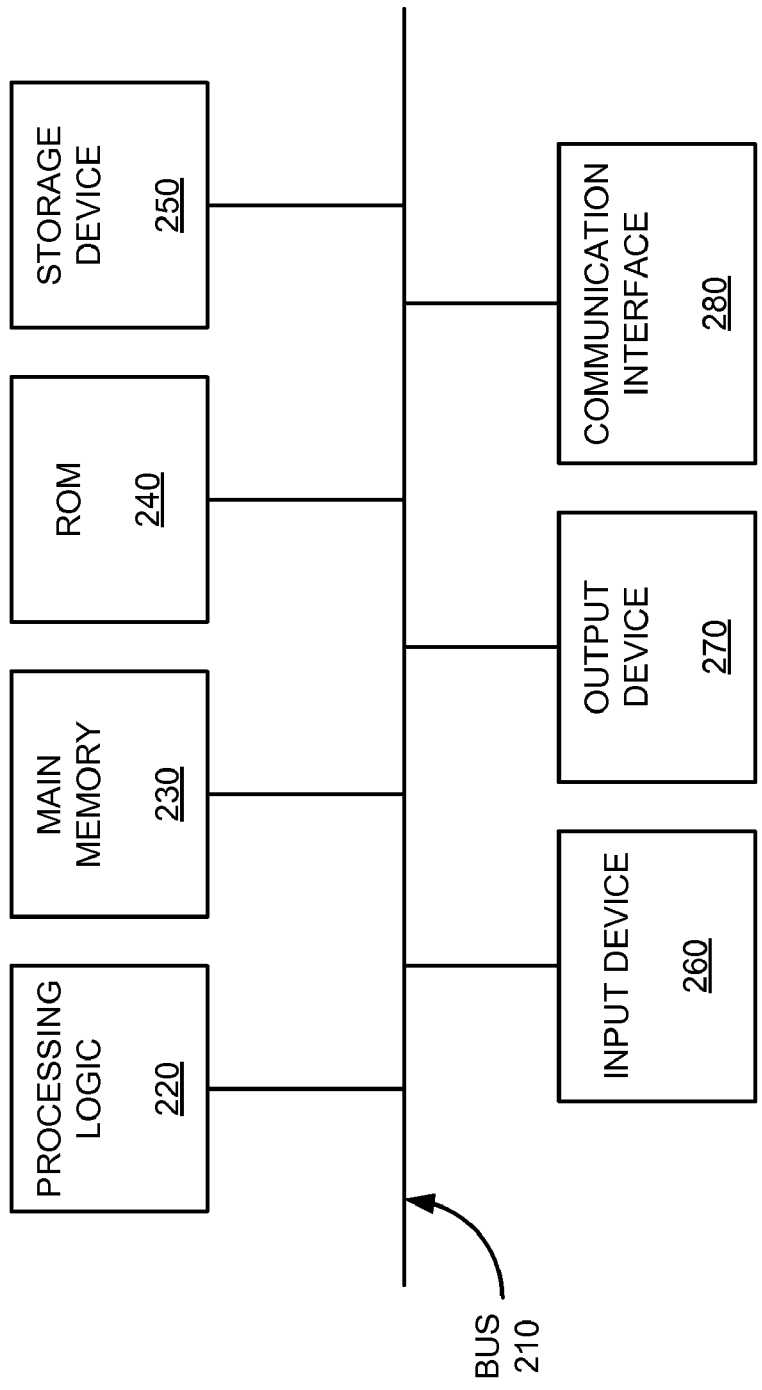
FIG. 2 illustrates exemplary components of a remote controller of the network depicted in FIG. 1.

FIG. 2 is an exemplary diagram of a device 200 that may correspond to remote controller 190. As illustrated, device 200 may include a bus 210, processing logic 220, a main memory 230, a read-only memory (ROM) 240, a storage device 250, an input device 260, an output device 270, and/or a communication interface 280. Bus 210 may include a path that permits communication among the components of device 200.

Processing logic 220 may include a central processing unit (CPU), a microprocessor, a field programmable gate array (FPGA), an application specific integrated circuit (ASIC), a micro electrical mechanical switch (MEMS), a general purpose graphical processing unit (GPGPU), an optical processor, a reduced instruction processor, or other type of processing logic that may interpret and execute instructions. Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 170.

As described herein, device 200 may perform certain operations in response to processing logic 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing logic 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Figure 3:
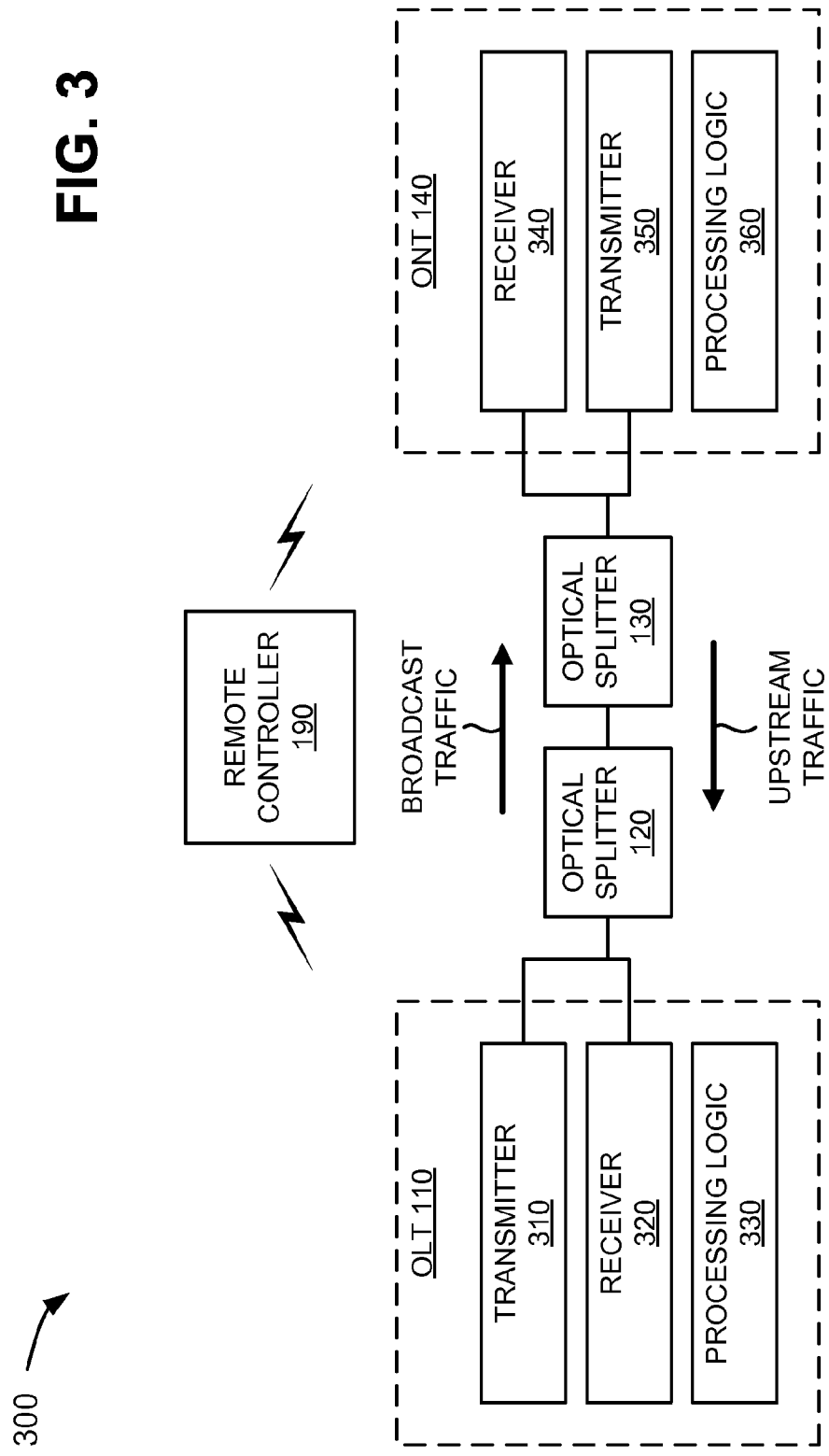
FIG. 3 depicts a diagram of a portion of the network depicted in FIG. 1, and exemplary components of an optical line terminal and an optical network terminal of the network.

FIG. 3 depicts a diagram of a portion 300 of network 100, and exemplary components of OLT 110 and ONT 140. As illustrated, network portion 300 may include a single OLT 110, optical splitters 120 and 130, a single ONT 140, and remote controller 190, as described above in connection with FIG. 1. As further shown in FIG. 3, OLT 110 may include a transmitter 310, a receiver 320, and processing logic 330, and ONT 140 may include a receiver 340, a transmitter 350, and processing logic 360.

Transmitter 310 may include a device capable of transmitting optical signals (e.g., broadcast or downstream traffic). In one implementation, transmitter 310 may include a device capable of transmitting optical signals at various wavelengths. Further details of transmitter 310 are provided below in connection with FIG. 4.

Receiver 320 may include a device capable of receiving optical signals (e.g., upstream traffic). In one implementation, receiver 320 may include a device capable of receiving optical signals at various wavelengths. Further details of receiver 320 are provided below in connection with FIGS. 5 and 6.

Processing logic 330 may include a CPU, a microprocessor, a FPGA, an ASIC, a MEMS, a GPGPU, an optical processor, a reduced instruction processor, or other type of processing logic that may interpret and execute instructions. In one implementation, processing logic 330 may interact with remote controller 190 (e.g., processing logic 220) to control functions of OLT 110 (e.g., to control functions of transmitter 310 and/or receiver 320).

Receiver 340 may include a device capable of receiving optical signals (e.g., broadcast traffic). In one implementation, receiver 340 may include a device capable of receiving optical signals at various wavelengths. Further details of receiver 340 are provided below in connection with FIGS. 7 and 8.

Transmitter 350 may include a device capable of transmitting optical signals (e.g., upstream traffic). In one implementation, transmitter 310 may include a device capable of transmitting optical signals at various wavelengths. Further details of transmitter 350 are provided below in connection with FIG. 9.

Processing logic 360 may include a CPU, a microprocessor, a FPGA, an ASIC, a MEMS, a GPGPU, an optical processor, a reduced instruction processor, or other type of processing logic that may interpret and execute instructions. In one implementation, processing logic 360 may interact with remote controller 190 (e.g., processing logic 220) to control functions of ONT 140 (e.g., to control functions of receiver 340 and/or transmitter 350).

Although FIG. 3 shows exemplary components of network portion 300, in other implementations, network portion 300 may contain fewer, different, or additional components than depicted in FIG. 3. In still other implementations, one or more components of network portion 300 may perform one or more other tasks described as being performed by one or more other components of network portion 300.

Figure 4:
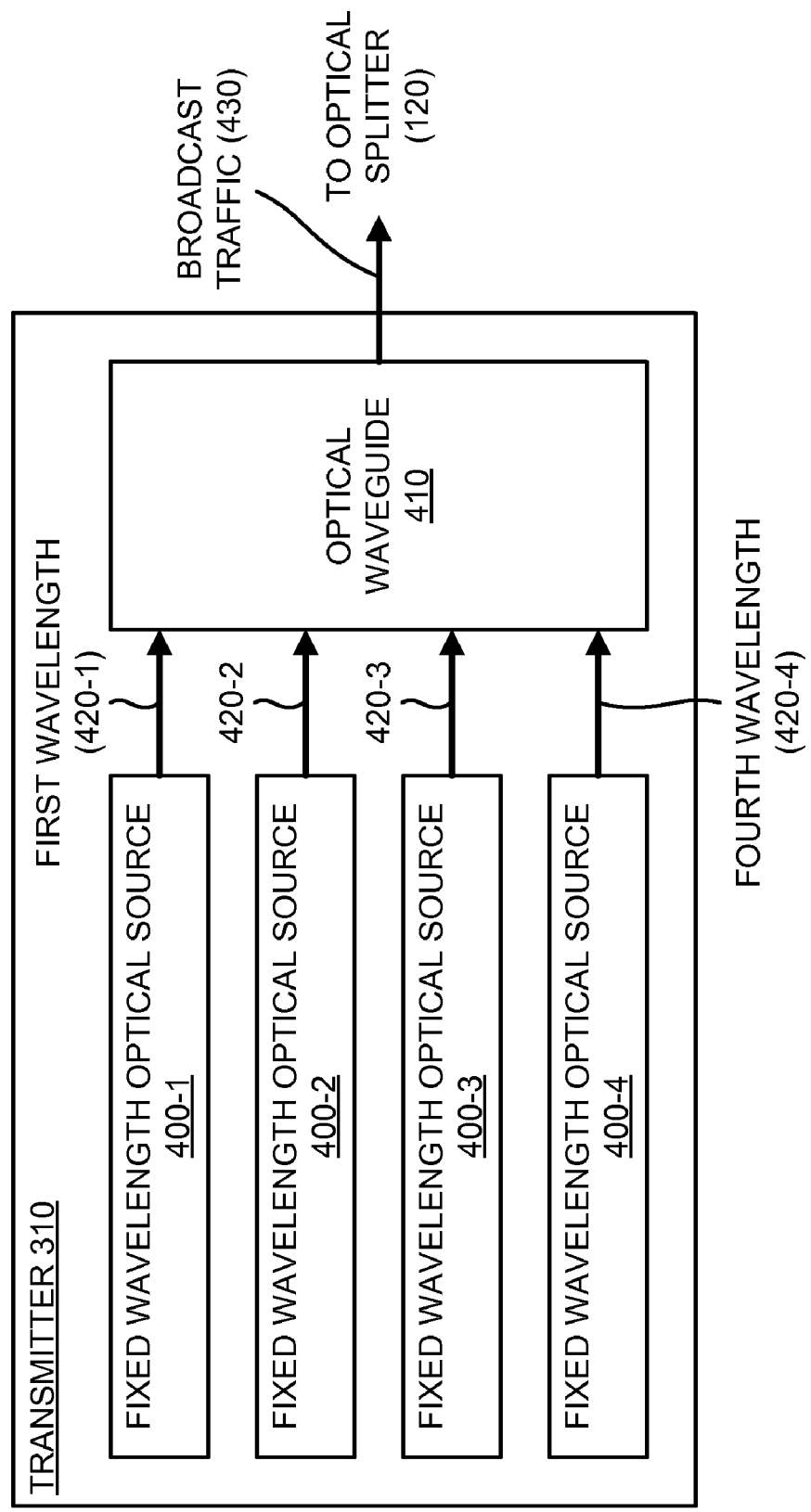
FIG. 4 illustrates a diagram of exemplary components of a transmitter of the optical line terminal depicted in FIG. 3.

FIG. 4 illustrates a diagram of exemplary components of transmitter 310 of OLT 110. As illustrated, transmitter 310 may include one or more fixed wavelength optical sources 400-1, 400-2, 400-3, and 400-4 (collectively referred to as "fixed wavelength optical sources 400" or individually as "fixed wavelength optical source 400"), and an optical waveguide 410.

Each of fixed wavelength optical sources 400 may include a device capable of generating optical signals. For example, in one implementation, fixed wavelength optical source 400 may include a low cost, fixed wavelength (or fixed frequency) laser. In one exemplary implementation, fixed wavelength optical source 400 may include a low cost laser having a narrow operation bandwidth (e.g., a range of about six to about eight nanometers separated at a few (e.g. two) nanometers) and being capable of being internally modulated to transmit more than zero Gbps to ten Gbps of data therein (e.g., and may be internally modulated to transmit ten Gbps or forty Gbps in the future). As further shown in FIG. 4, each fixed wavelength optical source 400 may generate an optical signal at a particular wavelength. For example, fixed wavelength optical source 400-1 may generate an optical signal at a first wavelength 420-1, fixed wavelength optical source 400-2 may generate an optical signal at a second wavelength 420-2, fixed wavelength optical source 400-3 may generate an optical signal at a third wavelength 420-3, and fixed wavelength optical source 400-4 may generate an optical signal at a fourth wavelength 420-4. First wavelength 420-1, second wavelength 420-2, third wavelength 420-3, and fourth wavelength 420-4 may include distinct wavelengths. Optical signals at first wavelength 420-1, second wavelength 420-2, third wavelength 420-3, and fourth wavelength 420-4 may be provided (e.g., by fixed wavelength optical sources 400) to optical waveguide 410.

Optical waveguide 410 may include a physical structure (e.g., an optical fiber, a rectangular waveguide, etc.) that may guide electromagnetic waves (e.g., optical signals) in the optical spectrum, and may be made from a variety of materials (e.g., a dielectric material with high permittivity, a photonic-crystal fiber, etc.). In one implementation, optical waveguide 410 may receive optical signals at first wavelength 420-1, second wavelength 420-2, third wavelength 420-3, and fourth wavelength 420-4 from fixed wavelength optical sources 400, and may provide the optical signals (e.g., as broadcast traffic 430) to optical splitter 120.

As further shown in FIG. 4, transmitter 310 need not include a filter(s) since each fixed wavelength optical source 400 may generate optical signals at a unique wavelength. Alternatively, fixed wavelength optical sources 400 of transmitter 310 may be replaced with a single high-powered broadband laser source and a filter array that enables selection of multiple wavelengths.

Although FIG. 4 shows exemplary components of transmitter 310, in other implementations, transmitter 310 may contain fewer, different, or additional components than depicted in FIG. 4. In still other implementations, one or more components of transmitter 310 may perform one or more other tasks described as being performed by one or more other components of transmitter 310.

Figure 5:
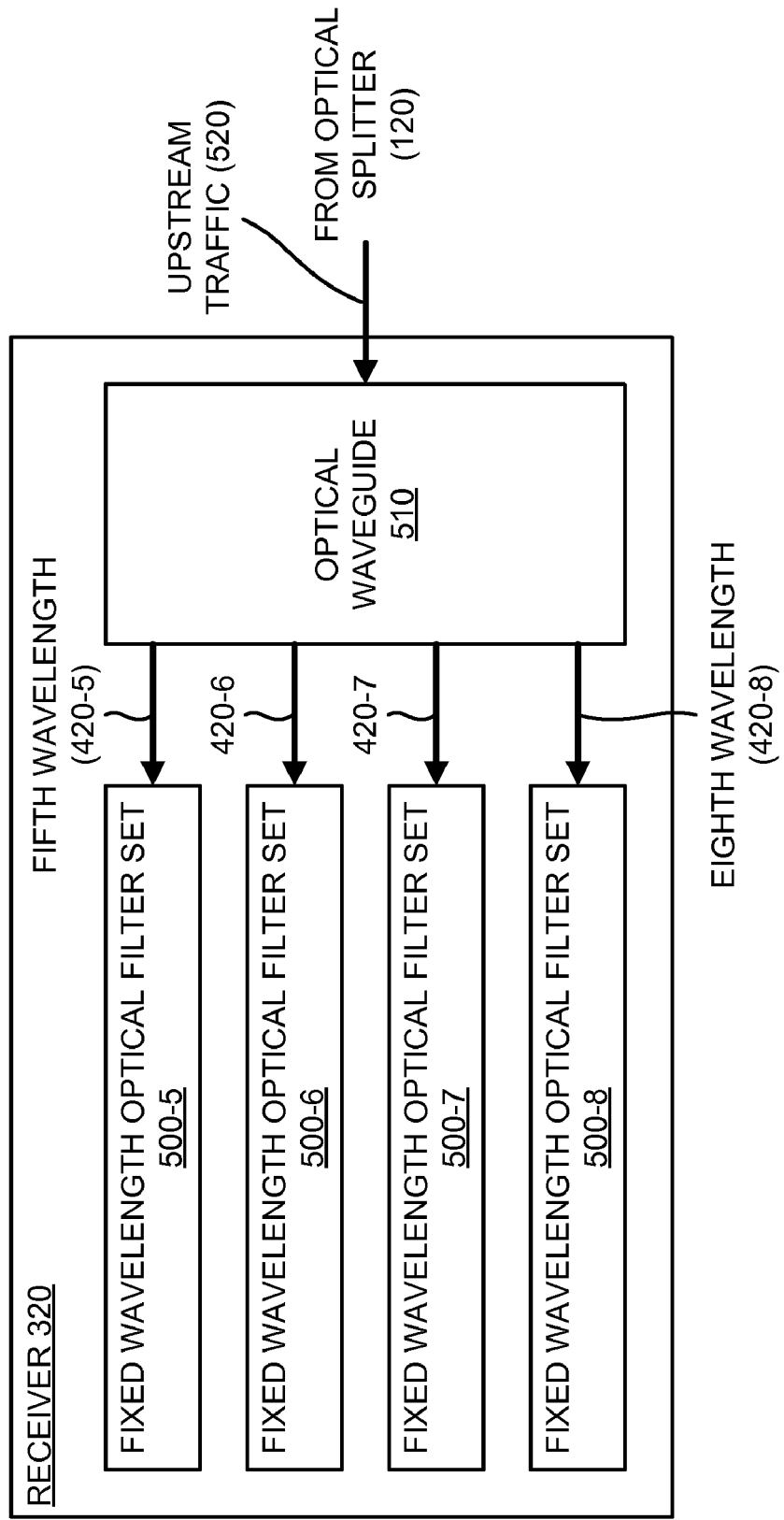
FIG. 5 depicts a diagram of exemplary components of a receiver of the optical line terminal illustrated in FIG. 3.

FIG. 5 illustrates a diagram of exemplary components of receiver 320 of OLT 110. As illustrated, receiver 320 may include one or more fixed wavelength optical filter sets 500-5, 500-6, 500-7, and 500-8 (collectively referred to as "fixed wavelength optical filter sets 500" or individually as "fixed wavelength optical filter set 500"), and an optical waveguide 510.

Each of fixed wavelength optical filter sets 500 may include a device capable of filtering optical signals. In one implementation, fixed wavelength optical filter set 500 may include an optical filter that selectively transmits or receives light having certain properties (e.g., a particular wavelength), while blocking the remainder of the light. As further shown in FIG. 5, each fixed wavelength optical filter set 500 may receive an optical signal at a particular wavelength. For example, fixed wavelength optical filter set 500-5 may receive an optical signal at a fifth wavelength 420-5, fixed wavelength optical filter set 500-6 may receive an optical signal at a sixth wavelength 420-6, fixed wavelength optical filter set 500-7 may receive an optical signal at a seventh wavelength 420-7, and fixed wavelength optical filter set 500-8 may receive an optical signal at an eighth wavelength 420-8. Fifth wavelength 420-5, sixth wavelength 420-6, seventh wavelength 420-7, and eighth wavelength 420-8 may include distinct wavelengths, and may be distinct from first wavelength 420-1, second wavelength 420-2, third wavelength 420-3, and fourth wavelength 420-4. Optical signals at fifth wavelength 420-5, sixth wavelength 420-6, seventh wavelength 420-7, and eighth wavelength 420-8 may be received from optical waveguide 510.

Optical waveguide 510 may include a physical structure (e.g., an optical fiber, a rectangular waveguide, etc.) that may guide electromagnetic waves (e.g., optical signals) in the optical spectrum, and may be made from a variety of materials (e.g., a dielectric material with high permittivity, a photonic-crystal fiber, etc.). In one implementation, optical waveguide 510 may receive upstream traffic 520 from optical splitter 120, and may provide upstream traffic 520 as optical signals at fifth wavelength 420-5, sixth wavelength 420-6, seventh wavelength 420-7, and eighth wavelength 420-8 to fixed wavelength optical filter sets 500.

Although FIG. 5 shows exemplary components of receiver 320, in other implementations, receiver 320 may contain fewer, different, or additional components than depicted in FIG. 5. In still other implementations, one or more components of receiver 320 may perform one or more other tasks described as being performed by one or more other components of receiver 320.

Figure 6:
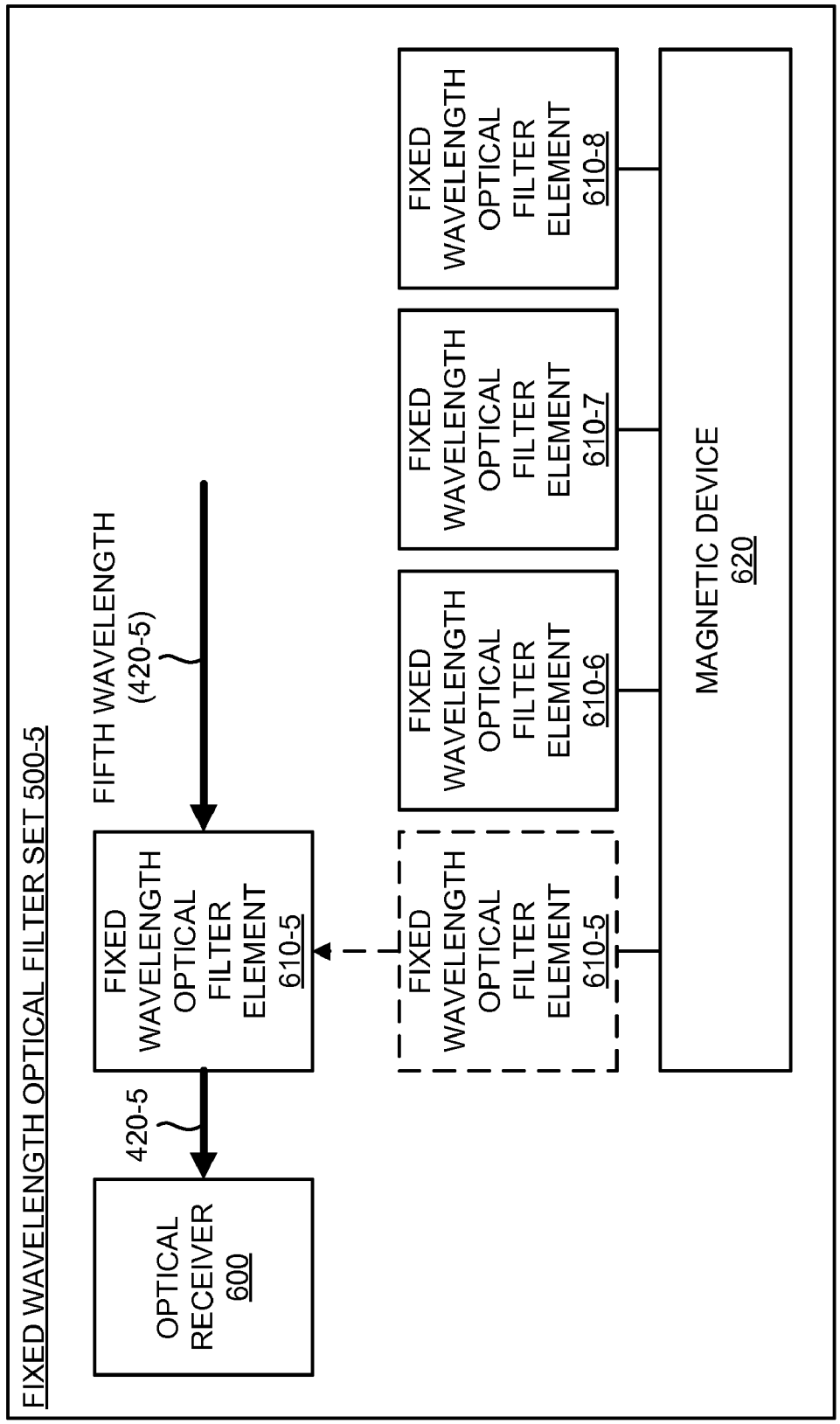
FIG. 6 illustrates a diagram of exemplary components of a fixed wavelength optical filter set of the receiver depicted in FIG. 5.

FIG. 6 illustrates a diagram of exemplary components of fixed wavelength optical filter set 500-5 of receiver 320. As illustrated, fixed wavelength optical filter set 500-5 may include an optical receiver 600, one or more fixed wavelength optical filter elements 610-5, 610-6, 610-7, and 610-8 (collectively referred to as "fixed wavelength optical filter elements 610" or individually as "fixed wavelength optical filter element 610"), and a magnetic device 620.

Optical receiver 600 may include a device capable of receiving optical signals (upstream traffic 520), and processing the received signals. For example, optical receiver 600 may receive optical signals requesting video information (e.g., from video network 180), and may forward the optical signals to video network 180. In one implementation, optical receiver 600 may include a positive intrinsic negative (PIN) optical receiver.

Each of fixed wavelength optical filter elements 610 may include a device capable of filtering optical signals. In one implementation, fixed wavelength optical filter element 610 may include a low loss optical filter that selectively transmits or receives light having certain properties (e.g., a particular wavelength), while blocking the remainder of the light. For example, fixed wavelength optical filter element 610-5 may transmit optical signals at fifth wavelength 420-5 but may block optical signals at other wavelengths, fixed wavelength optical filter element 610-6 may transmit optical signals at sixth wavelength 420-6 but may block optical signals at other wavelengths, fixed wavelength optical filter element 610-7 may transmit optical signals at seventh wavelength 420-7 but may block optical signals at other wavelengths, and fixed wavelength optical filter element 610-8 may transmit optical signals at eighth wavelength 420-8 but may block optical signals at other wavelengths. Each of fixed wavelength optical filter sets 500 may use fixed wavelength optical filter elements 610 to dynamically select which optical signal wavelength may be received by receiver 320.

Magnetic device 620 may include a device capable of physically moving fixed wavelength optical filter elements 610 so that they may be used in the respective fixed wavelength optical filter sets 500. In one implementation, magnetic device 620 may include an electromagnetic-based device (e.g., a solenoid actuator) in which a magnetic field may be produced by flow of an electric current, and may convert energy (e.g., the magnetic field) into linear motion. For example, magnetic device 620 may be activated (e.g., via processing logic 330), and may physically move one or more of fixed wavelength optical filter elements 610. Magnetic device 620 may quickly switch (e.g., within about 0.1 seconds) any of fixed wavelength optical filter elements 610.

As further shown in FIG. 6, fixed wavelength optical filter element 610-5 may be selected as the filter element for fixed wavelength optical filter set 500-5, and magnetic device 620 may position fixed wavelength optical filter element 610-5 in a position to receive optical signals at fifth wavelength 420-5. Fixed wavelength optical filter element 610-5 may be positioned adjacent to optical receiver 600 (e.g., by magnetic device 620), may receive the optical signal at fifth wavelength 420-5, and may provide the optical signal at fifth wavelength 420-5 to optical receiver 600. In one implementation, if fixed wavelength optical filter element 610-5, fixed wavelength optical filter element 610-6, fixed wavelength optical filter element 610-7, and fixed wavelength optical filter element 610-8 are positioned in front of optical receiver 600, all wavelengths of optical signals may be blocked from optical receiver 600.

Although FIG. 6 shows exemplary components of fixed wavelength optical filter set 500-5, in other implementations, fixed wavelength optical filter set 500-5 may contain fewer, different, or additional components than depicted in FIG. 6. In still other implementations, one or more components of fixed wavelength optical filter set 500-5 may perform one or more other tasks described as being performed by one or more other components of fixed wavelength optical filter set 500-5. The other fixed wavelength optical filter sets 500 described herein may include an arrangement similar to the arrangement of components depicted in FIG. 6.

Figure 7:
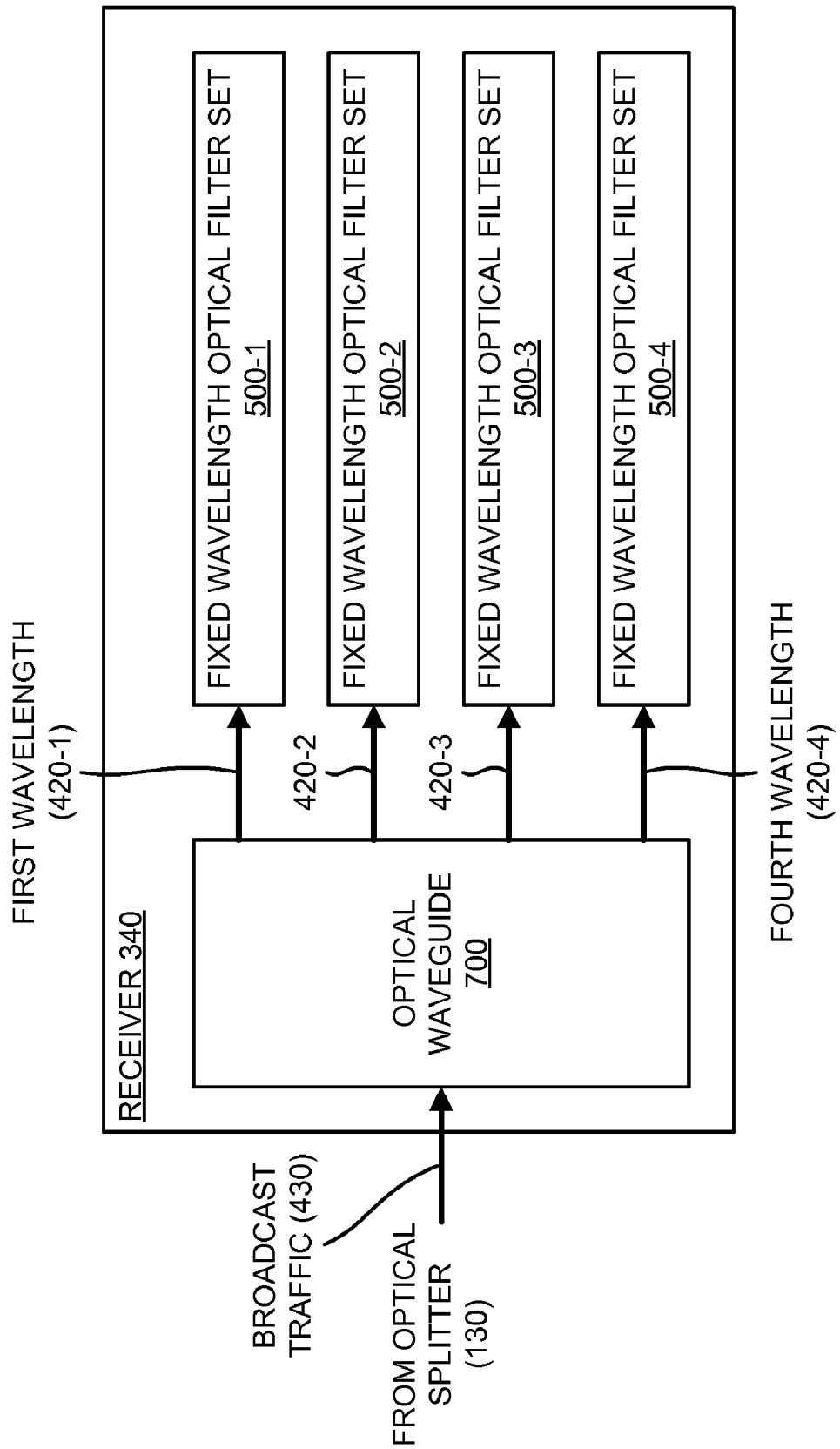
FIG. 7 depicts a diagram of exemplary components of a receiver of the optical network terminal illustrated in FIG. 3.

FIG. 7 illustrates a diagram of exemplary components of receiver 340 of ONT 140. As illustrated, receiver 340 may include one or more fixed wavelength optical filter sets 500-1, 500-2, 500-3, and 500-4 (collectively referred to as "fixed wavelength optical filter sets 500" or individually as "fixed wavelength optical filter set 500"), and an optical waveguide 700.

Each of fixed wavelength optical filter sets 500 may include a device capable of filtering optical signals. In one implementation, fixed wavelength optical filter set 500 may include an optical filter that selectively transmits or receives light having certain properties (e.g., a particular wavelength), while blocking the remainder of the light. As further shown in FIG. 7, each fixed wavelength optical filter set 500 may receive an optical signal at a particular wavelength. For example, fixed wavelength optical filter set 500-1 may receive an optical signal at first wavelength 420-1, fixed wavelength optical filter set 500-2 may receive an optical signal at second wavelength 420-2, fixed wavelength optical filter set 500-3 may receive an optical signal at third wavelength 420-3, and fixed wavelength optical filter set 500-4 may receive an optical signal at fourth wavelength 420-4. Optical signals at first wavelength 420-1, second wavelength 420-2, third wavelength 420-3, and fourth wavelength 420-4 may be received from optical waveguide 700. Optical signals at first wavelength 420-1, second wavelength 420-2, third wavelength 420-3, and fourth wavelength 420-4 (e.g., provided by transmitter 310 of OLT 110) may correspond with the optical signals received by fixed wavelength optical filter sets 500 of receiver 340 of ONT 140.

Optical waveguide 700 may include a physical structure (e.g., an optical fiber, a rectangular waveguide, etc.) that may guide electromagnetic waves (e.g., optical signals) in the optical spectrum, and may be made from a variety of materials (e.g., a dielectric material with high permittivity, a photonic-crystal fiber, etc.). In one implementation, optical waveguide 700 may receive broadcast traffic 430 from optical splitter 130, and may provide broadcast traffic 430 as optical signals at first wavelength 420-1, second wavelength 420-2, third wavelength 420-3, and fourth wavelength 420-4 to fixed wavelength optical filter sets 500.

Although FIG. 7 shows exemplary components of receiver 340, in other implementations, receiver 340 may contain fewer, different, or additional components than depicted in FIG. 7. In still other implementations, one or more components of receiver 340 may perform one or more other tasks described as being performed by one or more other components of receiver 340.

Figure 8:
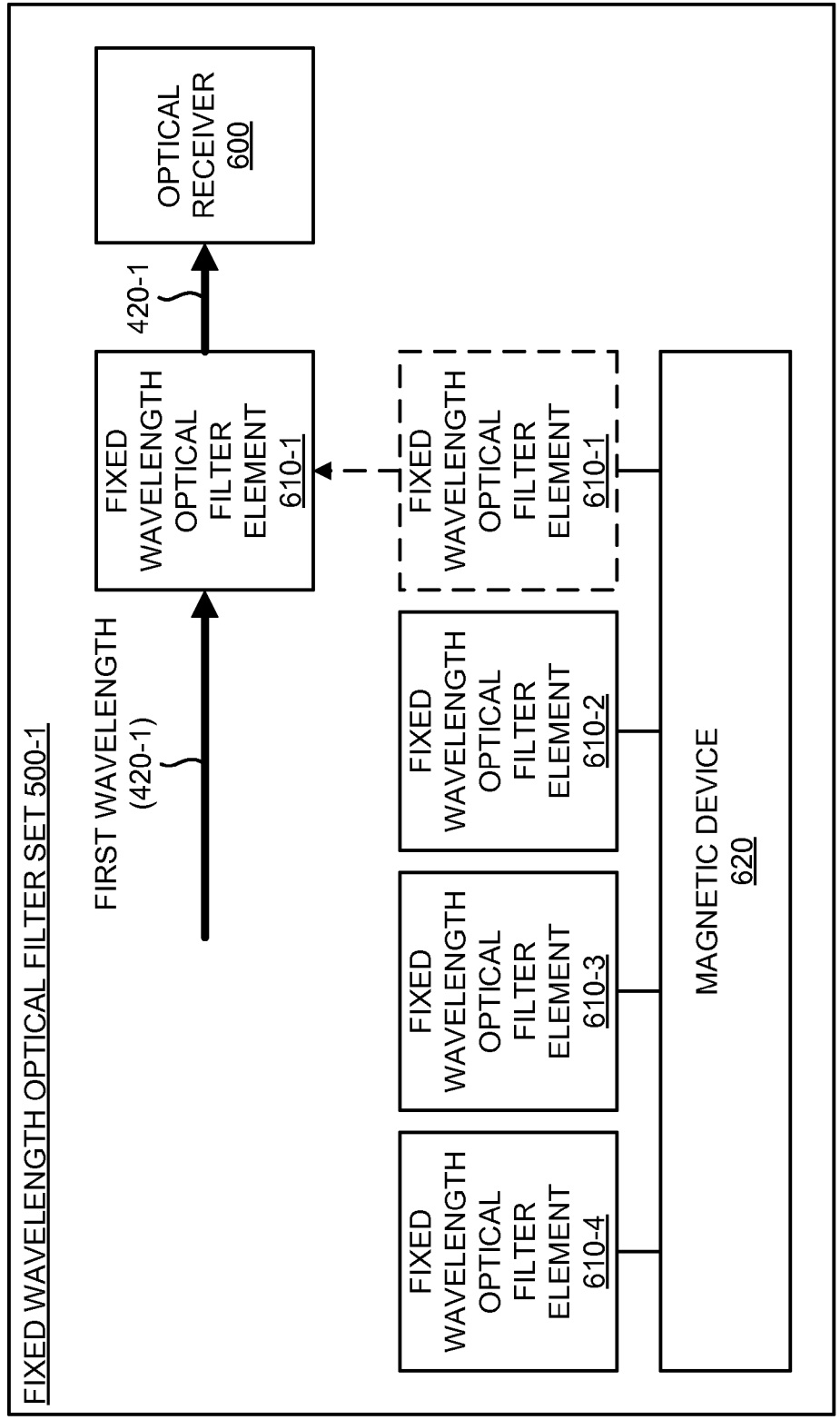
FIG. 8 illustrates a diagram of exemplary components of a fixed wavelength optical filter set of the receiver depicted in FIG. 7.

FIG. 8 illustrates a diagram of exemplary components of fixed wavelength optical filter set 500-1 of receiver 340. As illustrated, fixed wavelength optical filter set 500-1 may include optical receiver 600, one or more fixed wavelength optical filter elements 610-1, 610-2, 610-3, and 610-4 (collectively referred to as "fixed wavelength optical filter elements 610" or individually as "fixed wavelength optical filter element 610"), and magnetic device 620. Magnetic device 620 may include the features described above in connection with FIG. 6.

Optical receiver 600 may include a device capable of receiving optical signals (broadcast traffic 430), and processing the received signals. For example, optical receiver 600 may receive optical signals providing video information (e.g., from video network 180), and may forward the optical signals to a customer. In one implementation, optical receiver 600 may include a positive intrinsic negative (PIN) optical receiver.

Each of fixed wavelength optical filter elements 610 may include a device capable of filtering optical signals. In one implementation, fixed wavelength optical filter element 610 may include a low loss optical filter that selectively transmits or receives light having certain properties (e.g., a particular wavelength), while blocking the remainder of the light. For example, fixed wavelength optical filter element 610-1 may transmit optical signals at first wavelength 420-1 but may block optical signals at other wavelengths, fixed wavelength optical filter element 610-2 may transmit optical signals at second wavelength 420-2 but may block optical signals at other wavelengths, fixed wavelength optical filter element 610-3 may transmit optical signals at third wavelength 420-3 but may block optical signals at other wavelengths, and fixed wavelength optical filter element 610-4 may transmit optical signals at fourth wavelength 420-4 but may block optical signals at other wavelengths. Fixed wavelength optical filter sets 500 may use fixed wavelength optical filter elements 610 to dynamically select which optical signal wavelength may be received by receiver 340.

As further shown in FIG. 8, fixed wavelength optical filter element 610-1 may be selected as the filter element for fixed wavelength optical filter set 500-1, and magnetic device 620 may position fixed wavelength optical filter element 610-1 in a position to receive optical signals at first wavelength 420-1. Fixed wavelength optical filter element 610-1 may be positioned adjacent to optical receiver 600 (e.g., by magnetic device 620), may receive the optical signal at first wavelength 420-1, and may provide the optical signal at first wavelength 420-1 to optical receiver 600. In one implementation, if fixed wavelength optical filter element 610-1 fixed wavelength optical filter element 610-2, fixed wavelength optical filter element 610-3, and fixed wavelength optical filter element 610-4 are positioned in front of optical receiver 600, all wavelengths of optical signals may be blocked from optical receiver 600.

Although FIG. 8 shows exemplary components of fixed wavelength optical filter set 500-1, in other implementations, fixed wavelength optical filter set 500-1 may contain fewer, different, or additional components than depicted in FIG. 8. In still other implementations, one or more components of fixed wavelength optical filter set 500-1 may perform one or more other tasks described as being performed by one or more other components of fixed wavelength optical filter set 500-1. The other fixed wavelength optical filter sets 500 described herein may include an arrangement similar to the arrangement of components depicted in FIG. 8.

Figure 9:
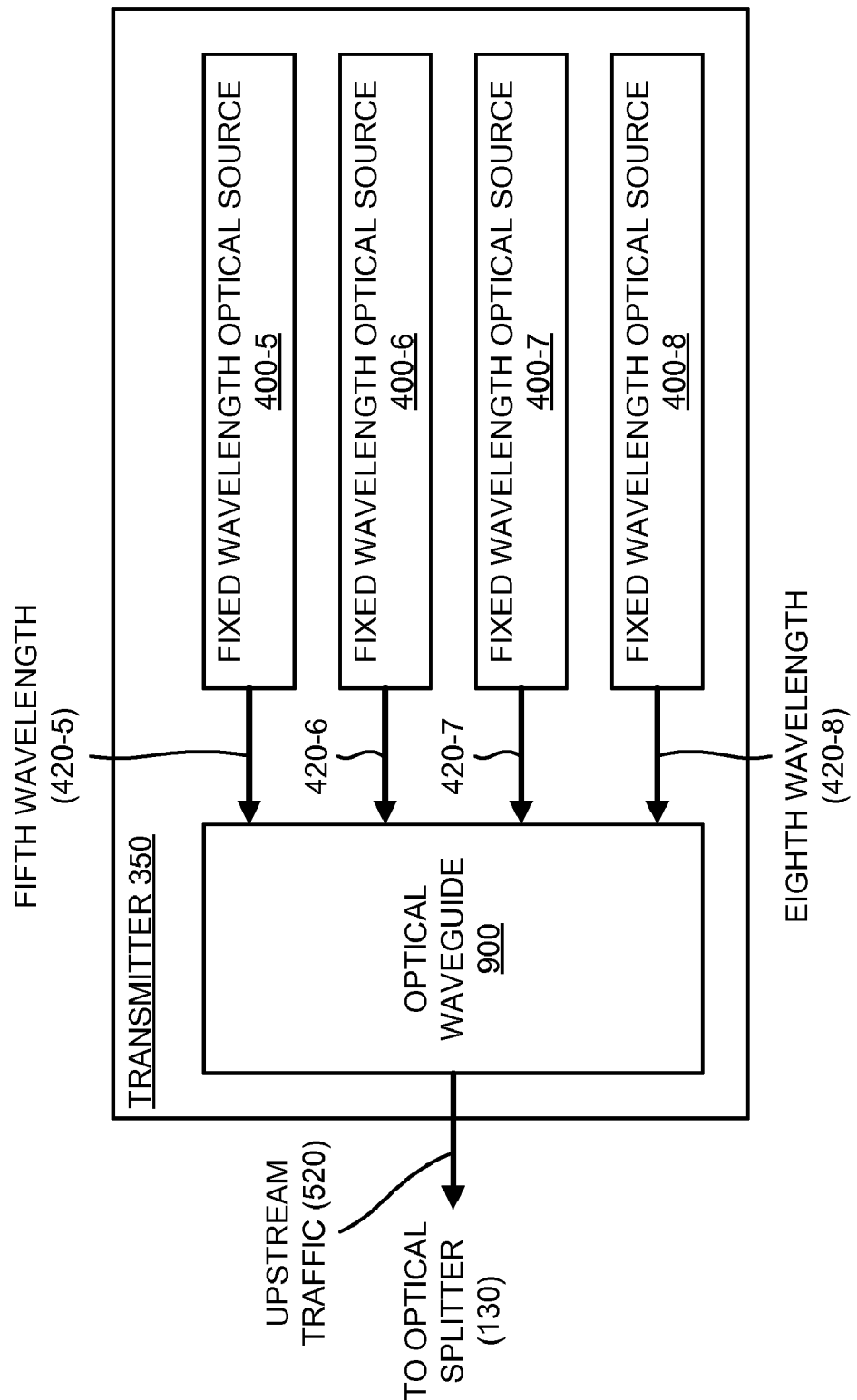
FIG. 9 depicts a diagram of exemplary components of a transmitter of the optical network terminal illustrated in FIG. 3.

FIG. 9 illustrates a diagram of exemplary components of transmitter 350 of ONT 140. As illustrated, transmitter 350 may include one or more fixed wavelength optical sources 400-5, 400-6, 400-7, and 400-8 (collectively referred to as "fixed wavelength optical sources 400" or individually as "fixed wavelength optical source 400"), and an optical waveguide 900.

Details of fixed wavelength optical sources 400 are provided above in connection with FIG. 4. Fixed wavelength optical source 400-5 may generate an optical signal at fifth wavelength 420-5, fixed wavelength optical source 400-6 may generate an optical signal at sixth wavelength 420-6, fixed wavelength optical source 400-7 may generate an optical signal at seventh wavelength 420-7, and fixed wavelength optical source 400-8 may generate an optical signal at eighth wavelength 420-8. Optical signals at fifth wavelength 420-5, sixth wavelength 420-6, seventh wavelength 420-7, and eighth wavelength 420-8 may be provided (e.g., by fixed wavelength optical sources 400) to optical waveguide 900. Optical signals at fifth wavelength 420-5, sixth wavelength 420-6, seventh wavelength 420-7, and eighth wavelength 420-8 may be received from optical waveguide 510 (e.g., provided by transmitter 350 of ONT 140) may correspond with the optical signals received by fixed wavelength optical filter sets 500 of receiver 320 of OLT 110.

Optical waveguide 900 may include a physical structure (e.g., an optical fiber, a rectangular waveguide, etc.) that may guide electromagnetic waves (e.g., optical signals) in the optical spectrum, and may be made from a variety of materials (e.g., a dielectric material with high permittivity, a photonic-crystal fiber, etc.). In one implementation, optical waveguide 900 may receive optical signals at fifth wavelength 420-5, sixth wavelength 420-6, seventh wavelength 420-7, and eighth wavelength 420-8 from fixed wavelength optical sources 400, and may provide the optical signals (e.g., as upstream traffic 520) to optical splitter 130.

As further shown in FIG. 9, transmitter 350 need not include a filter(s) since each fixed wavelength optical source 400 may generate optical signals at a unique wavelength. Alternatively, fixed wavelength optical sources 400 of transmitter 350 may be replaced with a single high-powered broadband laser source and a filter array that enables selection of multiple wavelengths.

Although FIG. 9 shows exemplary components of transmitter 350, in other implementations, transmitter 350 may contain fewer, different, or additional components than depicted in FIG. 9. In still other implementations, one or more components of transmitter 350 may perform one or more other tasks described as being performed by one or more other components of transmitter 350.

Figure 10:
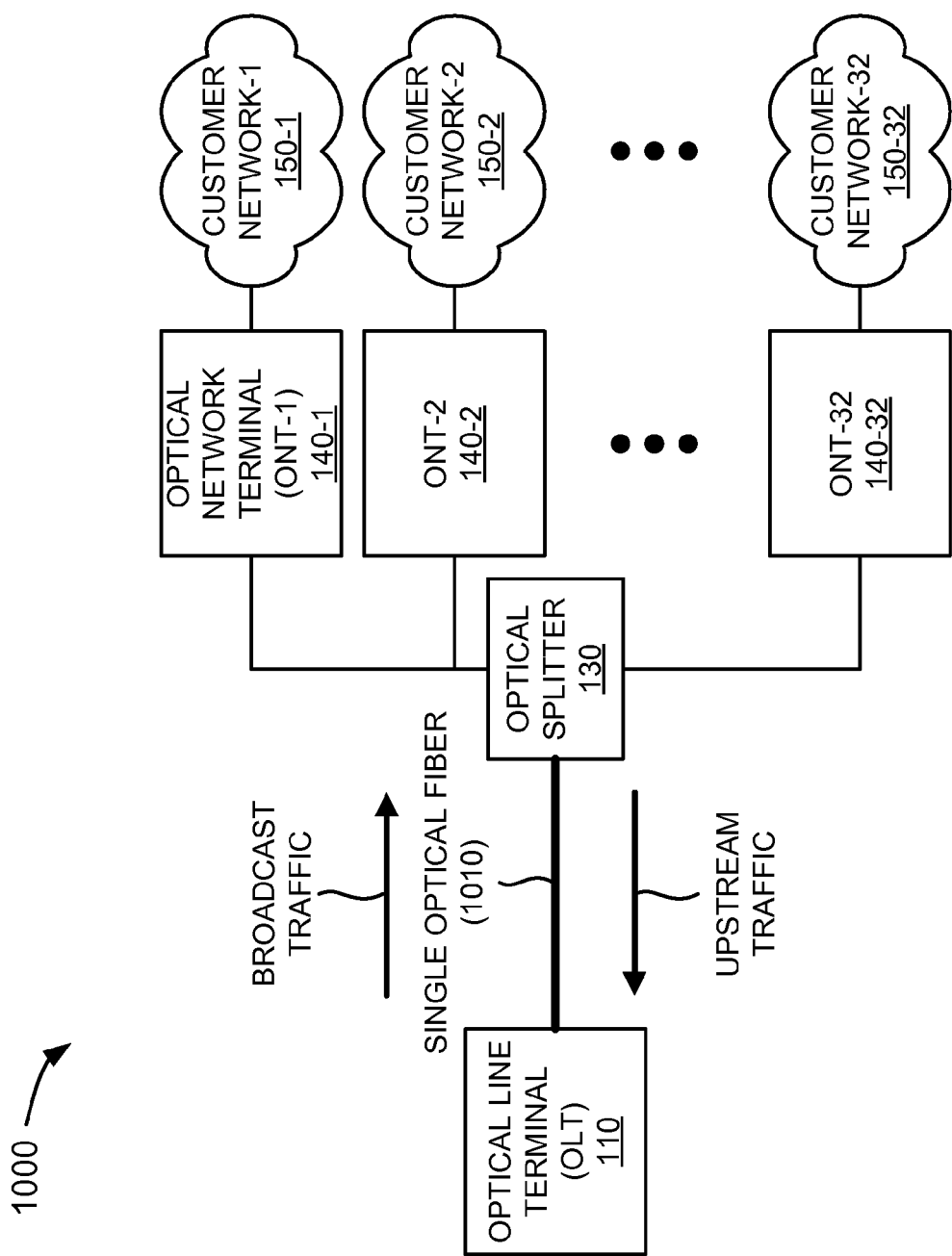
FIG. 10 is an exemplary diagram of another network in which systems and methods described herein may be implemented.

FIG. 10 is an exemplary diagram of another network 1000 in which systems and methods described herein may be implemented. As illustrated, network 1000 may include optical line terminal (OLT) 110, optical splitter 130, one or more optical network terminals (ONTs) 140-1, 140-2, . . . , 140-32, one or more customer networks 150-1, 150-2, . . . , 150-32 associated with corresponding ONTs 140, and a single optical fiber 1010 connecting OLT 110 to optical splitter 130. A single OLT, a single optical splitter, thirty-two ONTs, and thirty-two customer networks have been illustrated in FIG. 1 for simplicity. In practice, there may be more OLTs and optical splitters, and/or more or less ONTs and/or customer networks. In one implementation, OLT 110, optical splitter 130, and ONTs 140 may form a G-PON. In other implementations, OLT 110, optical splitter 130, and ONTs 140 may form other types of PONs (e.g., a broadband PON (B-PON), an Ethernet PON (E-PON), etc.). OLT 110, optical splitter 130, ONTs 140, and customer networks 150 may include the features described above in connection with FIG. 1. Network 1000 may further include IP network 160, voice network 170, video network 180, and/or remote controller 190 (not shown).

Single optical fiber 1010 may include a connection, a coupling, a link, or other similar mechanism by which optical signals, which may be carried by one optical component, may be imparted to a communicating optical component. For example, single optical fiber 1010 may permit ONT 110 to optically communicate with optical splitter 130, and may permit optical signals to be transmitted to ONTs 140. "Optically communicating" devices may not necessarily be directly connected to one another and may be separated by intermediate optical components or devices. In one implementation, broadcast traffic and upstream traffic may be provided in single optical fiber 1010, which may eliminate a need for optical isolation. A receiving filter (not shown) may block any interference from opposite direction traffic (e.g., may block interference from upstream traffic in broadcast traffic, and vice versa). In order to avoid traffic collisions, traffic traveling in one direction may include one or more wavelengths that are different than one or more wavelengths of traffic traveling in the opposite direction.

Although FIG. 10 shows exemplary components of network 1000, in other implementations, network 1000 may contain fewer, different, or additional components than depicted in FIG. 10. In still other implementations, one or more components of network 1000 may perform one or more other tasks described as being performed by one or more other components of network 1000.

Figure 11:
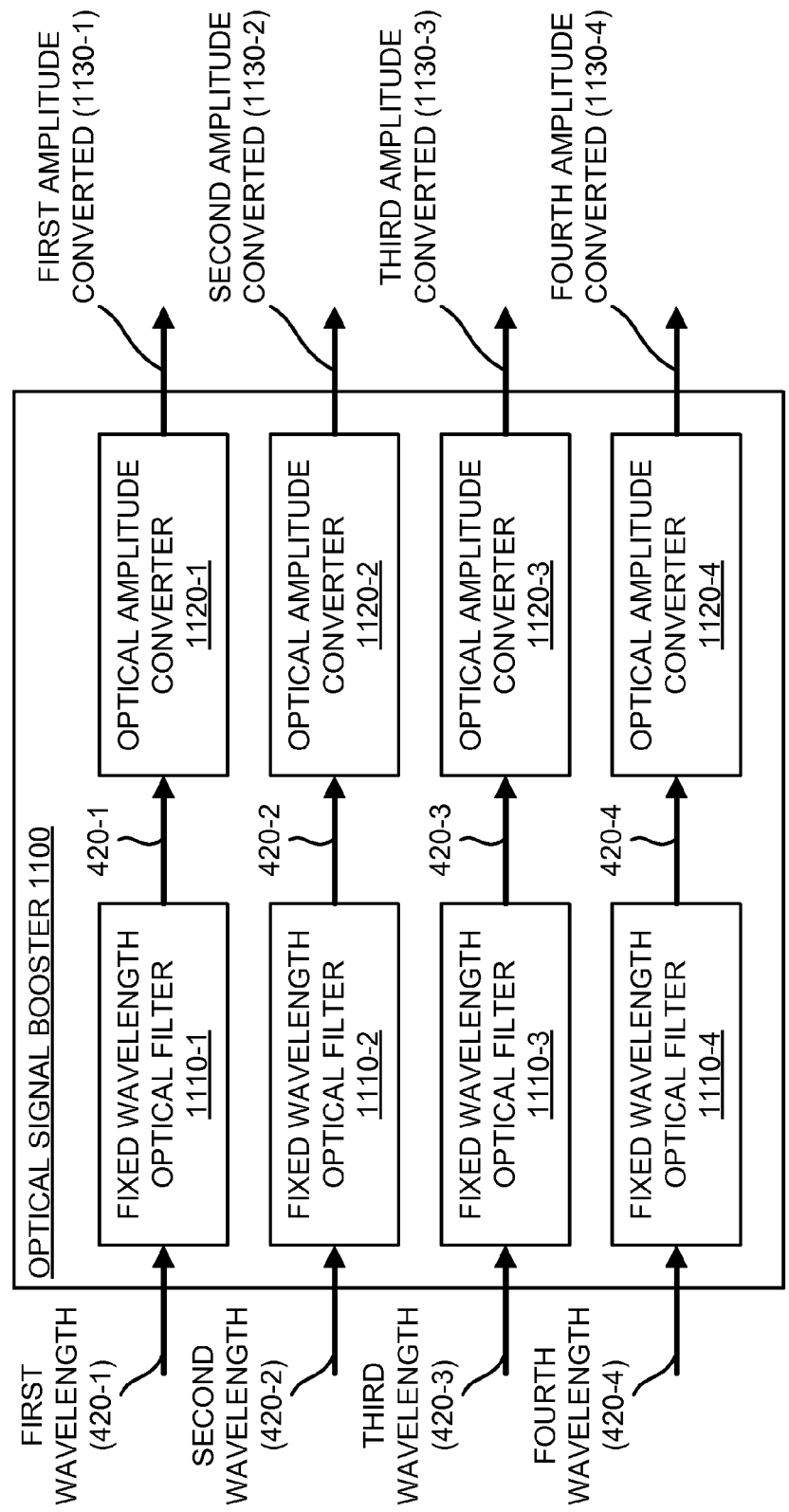
FIG. 11 illustrates a diagram of an optical signal booster that may be provided in the transmitters and/or receivers of the optical line terminal and/or the optical network terminal depicted in FIG. 3.

FIG. 11 illustrates a diagram of an optical signal booster 1100 that may be provided in the transmitters (e.g., transmitters 310 and 350) and/or receivers (e.g., receivers 320 and 340) of OLTs 110 and/or ONTs 140. Optical signal booster 1100 may be provided in the transmitters and/or receivers if an optical network (e.g., networks 100 and/or 1000) includes high order optical splitters and/or experience optical power losses. As illustrated, optical signal booster 1100 may include one or more fixed wavelength optical filters 1110-1, 1110-2, 1110-3, and 1110-4 (collectively referred to as "fixed wavelength optical filters 1110" or individually as "fixed wavelength optical filter 1110"), and one or more optical amplitude converters 1120-1, 1120-2, 1120-3, and 1130-4 (collectively referred to as "optical amplitude converters 1120" or individually as "optical amplitude converter 1120").

Each of fixed wavelength optical filters 1110 may include a device capable of filtering optical signals. In one implementation, fixed wavelength optical filter 1110 may include an optical filter that selectively transmits or receives light having certain properties (e.g., a particular wavelength), while blocking the remainder of the light. As further shown in FIG. 11, each fixed wavelength optical filter 1110 may receive an optical signal at a particular wavelength. For example, optical signals at first wavelength 420-1 may be received by fixed wavelength optical filter 1110-1, optical signals at second wavelength 420-2 may be received by fixed wavelength optical filter 1110-2, optical signals at third wavelength 420-3 may be received by fixed wavelength optical filter 1110-3, and optical signals at fourth wavelength 420-4 may be received by fixed wavelength optical filter 1110-4. Fixed wavelength optical filters 1110 may provide optical signals at first wavelength 420-1, second wavelength 420-2, third wavelength 420-3, and fourth wavelength 420-4 to corresponding optical amplitude converters 1120.

Details of fixed wavelength optical filters 1110 may be similar to those features described above in connection with fixed wavelength optical filter elements 610 of FIG. 6.

Each of optical amplitude converters 1120 may include a device that converts an optical signal into an optical signal with greater amplitude (e.g., which may boost the optical signal strength). In one exemplary implementation, optical amplitude converter 1120 may include an optical-to-electrical-to-optical (OEO)-based device that converts an optical signal into an optical signal with a greater amplitude. For example, optical signals at first wavelength 420-1, second wavelength 420-2, third wavelength 420-3, and fourth wavelength 420-4 may be received by corresponding optical amplitude converters 1120 from corresponding fixed wavelength optical filters 1110. Optical amplitude converters 1120 may convert the received optical signals to optical signals with greater amplitudes, and may output the amplitude converted optical signals. For example, optical amplitude converter 1120-1 may output a first amplitude converted optical signal 1130-1, optical amplitude converter 1120-2 may output a second amplitude converted optical signal 1130-2, optical amplitude converter 1120-3 may output a third amplitude converted optical signal 1130-3, and optical amplitude converter 1120-4 may output a first amplitude converted optical signal 1130-4.

Alternatively, optical signal booster 1100 may include a semiconductor-based optical amplifier capable of boosting optical signal strength.

Although FIG. 11 shows exemplary components of optical signal booster 1100, in other implementations, optical signal booster 1100 may contain fewer, different, or additional components than depicted in FIG. 11. In still other implementations, one or more components of optical signal booster 1100 may perform one or more other tasks described as being performed by one or more other components of optical signal booster 1100.

Figure 12:
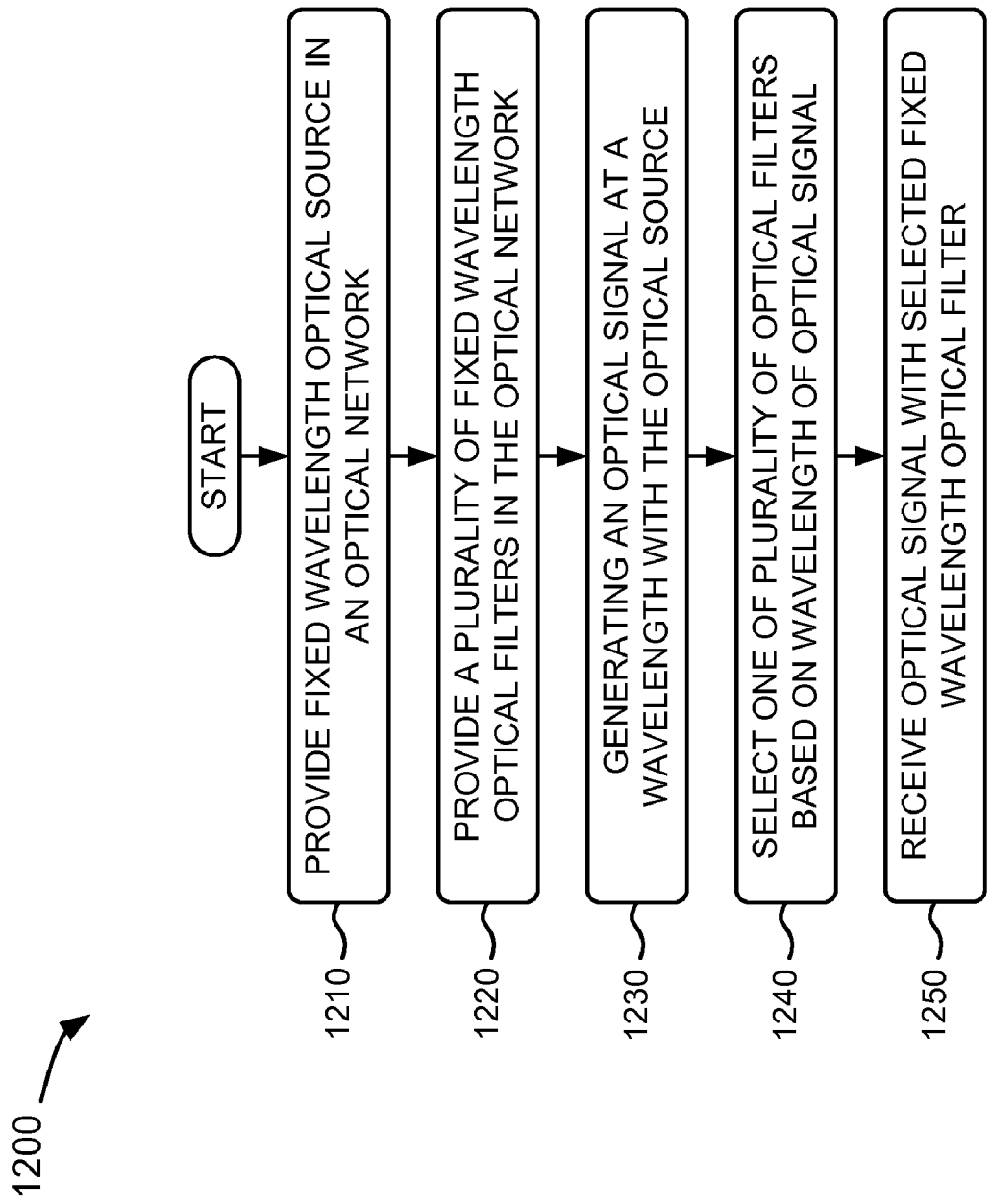

FIG. 12 depicts a flow chart of an exemplary process 1200 for providing one or more fixed wavelength optical sources and/or one or more dynamically-activated fixed wavelength optical filters in an optical network, according to implementations described herein. In one implementation, process 1200 may be performed by OLT 110 and/or ONT 140. In another implementation, some or all of process 1200 may be performed by another device or group of devices, including or excluding OLT 110 and/or ONT 140.

As illustrated in FIG. 12, process 1200 may begin with provision of a fixed wavelength optical source in an optical network (block 1210), and provision of a group of fixed wavelength optical filters in the optical network (block 1220). For example, in implementations described above in connection with FIGS. 4 and 5, transmitter 310 of OLT 110 (which may be provided in an optical network, such as network 100) may include one or more fixed wavelength optical sources 400. Receiver 320 of OLT 110 may include one or more fixed wavelength optical filter sets 500.

As further shown in FIG. 12, an optical signal at a wavelength may be generated with the fixed wavelength optical source (block 1230), one of the group of fixed wavelength optical filters may be selected based on the wavelength of the optical signal (block 1240), and the optical signal may be received with the selected fixed wavelength optical filter (block 1250). For example, in implementations described above in connection with FIGS. 4 and 6, each fixed wavelength optical source 400 may generate an optical signal at a particular wavelength. One of fixed wavelength optical filter elements 610 may be selected as the filter element for fixed wavelength optical filter set 500, and magnetic device 620 may position the selected fixed wavelength optical filter element 610 in a position to receive optical signals at a particular wavelength 420. Fixed wavelength optical filter element 610 may be positioned adjacent to optical receiver 600 (e.g., by magnetic device 620), may receive an optical signal at the particular wavelength 420, and may provide the optical signal at the particular wavelength 420 to optical receiver 600.

FIGS. 13 and 14 depict a flow chart of an exemplary process 1300 for receiving an optical signal from an optical network with one or more dynamically-activated fixed wavelength optical filters, according to implementations described herein. In one implementation, process 1300 may be performed by OLT 110 (e.g., by receiver 320) and/or ONT 140 (e.g., by receiver 340). In another implementation, some or all of process 1200 may be performed by another device or group of devices, including or excluding OLT 110 and/or ONT 140.

As illustrated in FIG. 13, process 1300 may begin with receipt of an optical signal at a wavelength from an optical network (block 1310), and selection of a fixed wavelength optical filter from a group of fixed wavelength optical filters based on the wavelength of the optical signal (block 1320). For example, in implementations described above in connection with FIGS. 5 and 6, fixed wavelength optical filter set 500 of receiver 320 may receive an optical signal at a particular wavelength. One of fixed wavelength optical filter elements 610 may be selected as the filter element for fixed wavelength optical filter set 500, and magnetic device 620 may position the selected fixed wavelength optical filter element 610 in a position to receive optical signals at a particular wavelength 420.

Returning to FIG. 13, the optical signal may be provided to an optical receiver via the selected fixed wavelength optical filter (block 1330). For example, in implementations described above in connection with FIG. 6, fixed wavelength optical filter element 610 may be positioned adjacent to optical receiver 600 (e.g., by magnetic device 620), may receive the optical signal at the particular wavelength 420, and may provide the optical signal at the particular wavelength 420 to optical receiver 600.

Process block 1320 may include the process blocks illustrated in FIG. 14. As shown in FIG. 14, process block 1320 may include determining a fixed wavelength optical filter element with a wavelength that matches the wavelength of the optical signal (block 1400), initiating a magnetic device to move the determined fixed wavelength optical filter element (block 1410), and moving the determined fixed wavelength optical filter element in a position for receipt of the optical signal (block 1420). For example, in implementations described above in connection with FIG. 6, fixed wavelength optical filter set 500 may determine (e.g., via processing logic 330) which of fixed wavelength optical filter elements 610 matches a received wavelength (e.g., fifth wavelength 420-5), and may initiate magnetic device 620 to move the determined fixed wavelength optical filter element (e.g., element 610-5). Magnetic device 620 may move fixed wavelength optical filter element 610-5 in position for receiving optical signal at fifth wavelength 420-5.

FIG. 15 depicts a flow chart of an exemplary process 1500 for generating an optical signal at a particular wavelength in an optical network with a fixed wavelength optical source, according to implementations described herein. In one implementation, process 1500 may be performed by OLT 110 (e.g., by transmitter 310) and/or ONT 140 (e.g., by transmitter 350). In another implementation, some or all of process 1200 may be performed by another device or group of devices, including or excluding OLT 110 and/or ONT 140.

As illustrated in FIG. 15, process 1500 may begin with a determination of a wavelength of an optical signal to transmit in an optical network (block 1510), and selection of a fixed wavelength optical source from a group of fixed wavelength optical sources based on the determined wavelength (block 1520). For example, in one implementation, remote controller 190 may determine a wavelength of an optical signal to transmit in network 100, and may select one of fixed wavelength optical sources 400 that is capable of generating the optical signal at the determined wavelength. For example, if the determined wavelength was first wavelength 420-1, remote controller may select fixed wavelength optical source 400-1 to generate the optical signal since it is capable generating optical signals at first wavelength 420-1.

As further shown in FIG. 15, the optical signal may be generated by the selected fixed wavelength optical source (block 1530). For example, in implementations described above in connection with FIG. 4, fixed wavelength optical source 420-1 may generate optical signals at first wavelength 420-1 and may provide the optical signals to optical splitter 120, via optical waveguide 410, for transmission through network 100.

Implementations described herein may provide one or more inexpensive fixed wavelength (or fixed frequency) optical sources and/or one or more inexpensive, dynamically-activated fixed wavelength (or fixed frequency) optical filters in an optical network that includes one or more optical line terminations (e.g., at a central office) and one or more optical network terminals (ONTs) (e.g., at end users' premises). Each optical line termination may include one or more optical line terminals (OLTs) that may communicate with associated ONTs. For example, in one implementation, the systems and/or methods may provide a fixed wavelength optical source and a group of fixed wavelength optical filters in an optical network. The systems and/or methods may generate an optical signal having a specified wavelength (e.g., the fixed wavelength), and may select one of the group of fixed wavelength optical filters based on the wavelength of the optical signal. The systems and/or methods may receive the optical signal with the selected fixed wavelength optical filter.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 12-15, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
   a plurality of fixed wavelength optical sources capable of generating a plurality of optical signals associated with a respective plurality of output wavelengths;
   a wave guide assembly connected to the plurality of fixed wavelength optical sources, an optical sensor, and an optical network, the wave guide assembly including a plurality of fixed wavelength optical filter elements that selectively pass optical signals associated with a respective plurality of input wavelengths; and
   a processor to:
      activate one of the plurality of fixed wavelength optical sources, the one of the plurality of fixed wavelength optical sources generating a first optical signal associated with a first wavelength, and
      activate one of the plurality of fixed wavelength filter elements, the one of the plurality of fixed wavelength filter elements selectively passing a second wavelength,
   the wave guide assembly being to:
      direct the first optical signal, generated by the one of the plurality of fixed wavelength optical sources, to the optical network, and
      direct, via the activated one of the plurality of fixed wavelength filter elements, a second optical signal to the optical sensor, the second optical signal being received from the optical network and being generated at a source external to the device, the second optical signal being associated with the second wavelength, and
      block one or more signals associated with one or more other wavelengths carried on the optical network, including the first wavelength, from the optical sensor.

2. The device of claim 1, the wave guide assembly further including:
   a motor to move the one of the plurality of fixed wavelength optical filter elements into an optical path, to the optical network, to receive the second optical signal.

3. The device of claim 1, the wave guide assembly further including:
   an optical wave guide to transmit the first optical signal to the optical network.

4. The device of claim 1, the processor being further to:
   select, based on the first wavelength, the one of the plurality of fixed wavelength optical filter elements, from the plurality of fixed wavelength optical filter elements, the first wavelength and the second wavelength being different.

5. The device of claim 1, each of the plurality of fixed wavelength optical sources including:
a laser operating in a narrow operation bandwidth.

6. The device of claim 1,
the processor being further to:
identify a third wavelength that differs from the second wavelength,
deactivate the one of the plurality of fixed wavelength optical filter elements, and
activate another one of the plurality of fixed wavelength optical filter elements, the other one of the plurality of fixed wavelength optical filter elements transmitting a third optical signal associated with the third wavelength, the wave guide assembly being further to:
direct, from the optical network and via the activated other one of the plurality of fixed wavelength optical filter elements, a third optical signal, associated the third wavelength, to the optical sensor, the third optical signal being generated external to the device.

7. The device of claim 1, each of the plurality of fixed wavelength optical filter elements including:
a low loss optical filter to:
selectively transmit or receive light transmitted at a corresponding wavelength, while blocking other light not transmitted at the corresponding wavelength.

8. The device of claim 1, the processor being further to:
activate another one of the plurality of fixed wavelength optical sources, the other one of the plurality of fixed wavelength optical sources generating a third optical signal associated with a third wavelength that differs from the first wavelength and the second wavelength,
the waveguide being further to direct the third signal to the optical network.

9. The device of claim 1, the processor being further to:
select a third wavelength that differs from the first wavelength and the second wavelength,
send a message to the source, the message causing the source to transmit a third signal at the third wavelength, and
deactivate the one of the plurality of fixed wavelength filter elements, and
activate another one of the plurality of fixed wavelength filter elements, the other one of the plurality of fixed wavelength filter elements selectively passing the third wavelength.

10. The device of claim 1, the wave guide assembly further comprising a plurality of optical amplitude converters coupled to, respectively, the plurality of fixed wavelength filter elements,
one of the plurality of optical amplitude converters, which is coupled to the one of the plurality of fixed wavelength filter elements, changing an amplitude associated with the second optical signal prior to the second optical signal being received by the optical sensor.

11. The device of claim 1, further comprising:
an optical splitter to direct the second optical signal from the optical network to the one of the plurality of fixed wavelength filter elements.

12. The device of claim 11, the processor being further to activate another one of the plurality of fixed wavelength filter elements, the other one of the plurality of fixed wavelength filter elements selectively passing a third wavelength that differs from the second wavelength,
the optical splitter being further to:
direct a third optical signal from the optical network to the other one of the plurality of fixed wavelength filter elements, the third optical signal being associated with the third wavelength.

13. A method comprising:
determining, by a device, a first wavelength of a plurality of wavelengths associated with signals carried on an optical network;
selecting, by the device and based on the first wavelength, one of a plurality of fixed wavelength optical sources, the one of the plurality of fixed wavelength optical sources outputting a first optical signal at a second wavelength that differs from the first wavelength;
transmitting, by the device, the first optical signal to the optical network;
identifying, by the device and based on the first wavelength, one of a plurality of fixed wavelength optical filter elements that are associated with a respective plurality of wavelengths, the one of the plurality of fixed wavelength optical filter elements transmitting the first wavelength and blocking other wavelengths of the plurality of wavelengths; and
moving, by the device, the one of the plurality of fixed wavelength optical filter elements into an optical path to the optical network, the moved one of the plurality of fixed wavelength optical filter elements directing a second optical signal, of the signals carried on the optical network to an optical sensor, the second optical signal being associated with the first wavelength.

14. The method of claim 13, further comprising:
generating, by the device, a third optical signal, associated with a third wavelength that differs from the first wavelength and the second wavelength; and
directing the third optical signal to the optical network.

15. The method of claim 13, further comprising:
moving the one of the plurality of fixed wavelength optical filter elements out of the optical path; and
moving another one of the plurality of fixed wavelength optical filter elements into the optical path, the other one of the plurality of fixed wavelength optical filter elements transmitting a third wavelength that differs from the second wavelength,
the other one of the plurality of fixed wavelength optical filter elements, when moved into the optical path, directing a third optical signal, associated with the third wavelength, to the optical sensor.

16. The method of claim 13, the moving the one of the plurality of fixed wavelength optical filter elements including:
moving, by a motor and into the optical path, the identified one of the plurality of fixed wavelength optical filter elements; and
preventing, by the motor, other ones of the plurality of fixed wavelength optical filter elements from entering the optical path.

17. A non-transitory computer readable medium to store instructions the instructions comprising:
instructions which, when executed by a device, cause the device to:
receive a plurality of first optical signals in an optical network, the plurality of first optical signals being associated with a respective plurality of first wavelengths;
select a particular first wavelength, of the plurality of first wavelengths;

move one of a plurality of fixed wavelength optical filter elements into an optical path between the device and an optical sensor, the one of the plurality of fixed wavelength optical filter elements transmitting the particular first wavelength and blocking other wavelengths of the plurality of first wavelengths;

direct, from the optical network and via the one of the plurality of fixed wavelength filter elements, a first optical signal, associated with a second wavelength, to the optical sensor; and activate, based on the particular first wavelength, one of a plurality of fixed wavelength optical sources, the plurality of fixed wavelength optical sources generating second optical signals at a respective plurality of second wavelengths, the activated one of the plurality of fixed wavelength optical sources being associated with a particular second wavelength that differs from the particular first wavelength, an output, from the activated one of the plurality of fixed wavelength optical sources and at the particular second wavelength, being provided, via a wave guide connected to the one of the plurality of fixed wavelength optical sources, into the optical network.

18. The non-transitory computer readable medium of claim 17, the instructions, when executed by the device to move the one of a plurality of fixed wavelength optical filter elements, further causing the device to:

activate a motor to move the one of the plurality of fixed wavelength optical filter elements into the optical path and to keep other ones of the plurality of fixed wavelength optical filter elements out of the optical path.

19. The non-transitory computer readable medium of claim 17, the instructions, when executed by the device, further causing the device to:

move, out of the optical path, the one of a plurality of fixed wavelength optical filter elements;

select another first wavelength that differs from the particular first wavelength;

move, into the optical path, another one, of the plurality of fixed wavelength optical filter elements, the other one of the plurality of fixed wavelength optical filter elements transmitting the other first wavelength.

20. The non-transitory computer readable medium of claim 17, the instructions, when executed by the device, further causing the device to:

active another one of the plurality of fixed wavelength optical sources, the activated other one of the plurality of fixed wavelength optical sources being associated with another second wavelength that differs from the particular first wavelength, an output, from the activated other one of the plurality of fixed wavelength optical sources and at the other second wavelength, being provided to the optical network.

\* \* \* \* \*